(12) United States Patent
Egner et al.

(10) Patent No.: US 12,320,751 B2
(45) Date of Patent: Jun. 3, 2025

(54) METHODS OF CORRECTING ABERRATION-INDUCED IMAGING ERRORS

(71) Applicant: Institut für Nanophotonik Goettingen e.V., Goettingen (DE)

(72) Inventors: Alexander Egner, Goettingen (DE); Claudia Geisler, Bad Gandersheim (DE); Francesco Rocca, Goettingen (DE)

(73) Assignee: INSTITUT FÜR NANOPHOTONIK GÖTTINGEN E.V., Göttingen (DE)

( * ) Notice: Subject to any disclaimer, the term of this patent is extended or adjusted under 35 U.S.C. 154(b) by 728 days.

(21) Appl. No.: 17/624,920

(22) PCT Filed: Jul. 1, 2020

(86) PCT No.: PCT/EP2020/068501
§ 371 (c)(1),
(2) Date: Jul. 25, 2022

(87) PCT Pub. No.: WO2021/004850
PCT Pub. Date: Jan. 14, 2021

(65) Prior Publication Data
US 2022/0364994 A1    Nov. 17, 2022

(30) Foreign Application Priority Data
Jul. 8, 2019    (DE) ............... 10 2019 118 446.0

(51) Int. Cl.
*G01N 21/64*    (2006.01)
*G02B 21/00*    (2006.01)

(52) U.S. Cl.
CPC ..... *G01N 21/6458* (2013.01); *G01N 21/6402* (2013.01); *G01N 21/6408* (2013.01);
(Continued)

(58) Field of Classification Search
None
See application file for complete search history.

(56) References Cited

U.S. PATENT DOCUMENTS

| | | | | |
|---|---|---|---|---|
| 6,914,236 | B2 * | 7/2005 | Hoffmann | ............ G02B 21/002 250/201.3 |
| 7,633,053 | B2 * | 12/2009 | Wolleschensky | ...... G02B 26/06 250/201.3 |

(Continued)

FOREIGN PATENT DOCUMENTS

| | | |
|---|---|---|
| DE | 19930532 A1 | 1/2001 |
| DE | 10227120 A1 | 3/2004 |

(Continued)

OTHER PUBLICATIONS

Yan, Wei et al.: "Coherent optical adaptive technique improves the spatial resolution of STED microscopy in thick samples".
(Continued)

*Primary Examiner* — Marcus H Taningco
*Assistant Examiner* — Djura Malevic
(74) *Attorney, Agent, or Firm* — Thomas | Horstemeyer, LLP

(57) ABSTRACT

For correcting aberration-induced imaging errors of an optical system which includes an objective (14) and an adaptive optic (18), light (5) and a sample (20) are selected such that the light (5), in acting upon the sample (20), reduces a measurement signal (28) from the sample (20), wherein a relative variation of the measurement signal (28) depends on the intensity of the light (5). The measurement signal (28) from a focal area of the optical system in the sample (20) is registered over a first and a later second period of time (38, 37) to determine a first measurement value and a second measurement value. Over a third period of time (39) which overlaps with the first and/or the second period of time, the light (5) is focused into the focal area by means of the optical (Continued)

system. A measure value for the relative variation of the measurement signal (28) is determined from the first and the second measurement values and used in controlling the adaptive optic (18) as a metric to be optimized.

22 Claims, 19 Drawing Sheets

(52) U.S. Cl.
CPC ..... *G01N 21/6428* (2013.01); *G02B 21/0076* (2013.01); *G01N 2021/6439* (2013.01)

(56) References Cited

U.S. PATENT DOCUMENTS

| | | | | |
|---|---|---|---|---|
| 8,730,573 | B2* | 5/2014 | Betzig | G01J 9/00 |
| | | | | 359/388 |
| 10,281,698 | B2* | 5/2019 | Singer | G02B 21/0076 |
| 10,802,256 | B2* | 10/2020 | Anhut | G02B 27/4227 |
| 12,135,286 | B1* | 11/2024 | Mazed | G01N 21/65 |
| 2006/0186327 | A1* | 8/2006 | Wolleschensky | G02B 27/4244 |
| | | | | 250/201.3 |
| 2013/0278744 | A1* | 10/2013 | Debarre | G02B 21/06 |
| | | | | 348/79 |
| 2014/0104618 | A1* | 4/2014 | Potsaid | G02B 27/0068 |
| | | | | 356/497 |
| 2015/0226950 | A1* | 8/2015 | Booth | G01N 21/636 |
| | | | | 250/459.1 |

FOREIGN PATENT DOCUMENTS

| | | |
|---|---|---|
| DE | 102013218795 A1 | 3/2015 |
| DE | 102014002328 A1 | 8/2015 |
| JP | 2002228934 A | 8/2002 |
| JP | 2012533069 A | 12/2012 |
| WO | 2011006106 A1 | 1/2011 |
| WO | 2014029978 A1 | 2/2014 |
| WO | 2018042056 A1 | 3/2018 |

OTHER PUBLICATIONS

Zdankowski, Piotr et al.: "An adaptive optics 3D STED microscope for super-resolution imaging of thick samples with background noise suppression using digital image processing".

Jacopo, Antonello et al.: "Sensorless adaptive optics for isoSTED nanoscopy".

Wang, Yifan et al.: "A 3D aligning method for stimulated emission depletion microscopy using fluorescence lifetime distribution".

* cited by examiner

METHODS OF CORRECTING ABERRATION-INDUCED IMAGING ERRORS

CROSS REFERENCE TO RELATED APPLICATIONS

This application is the US national phase of International Application PCT/EP2020/068501 filed on Jul. 1, 2020 and claiming priority to German patent application DE 10 2019 118 446.0 entitled "Verfahren and Mikroskop mit einer Korrekturvorrichtung zur Korrektur von aberrations-induzierten Abbildungsfehlern" and filed on Nov. 22, 2018.

FIELD OF THE INVENTION

The invention relates to methods of correcting aberration-induced imaging errors of an optical system including an objective and an adaptive optic in a beam path through the objective.

On the one hand, the aberration-induced imaging errors may be attributable to the optical system itself, if the optical system is, for example, not sufficiently achromatic. On the other hand, the basic aberrations may also be caused by an area of a sample located in front of the focal area of the optical system.

The aberration-induced imaging errors of the optical system to be corrected have an effect both in projecting a light intensity distribution by means of the objective into the respective sample and in imaging the sample by means of the objective.

BACKGROUND

A correction of aberration-induced imaging errors which are attributable to inhomogeneities of the optical properties of a sample, particularly a thicker sample, is known from Wei Yan, et al.: Coherent optical adaptive technique improves the spatial resolution of STED microscopy in thick samples, Photonics Research, Vol. 5, No. 3, June 2017. A method called COAT (Coherent Optical Adaptive Technique) is applied, in which the phase distortion by the respective sample is measured and compensated. Both for measuring and for compensating the phase distortion, an SLM (Spatial Light Modulator) is used by which, in STED microscopy, the phase fronts of stimulation light are also modulated such that the stimulation light focused into the sample has a donut-shaped intensity distribution. The phase distortion by the sample is measured in that a phase pattern, in which the phase shift is modulated with different frequencies in different areas, is imprinted on a beam of stimulation light by means of the SLM, wherein the intensity of a spot, into which the beam of the stimulation light is focused afterwards, is registered with temporal resolution and analyzed by Fourier transformation. Practically, phase offsets which compensate the aberration-induced imaging errors are searched for in the individual areas of the phase pattern imprinted by means of the SLM. Particularly, the intensity of the spot is registered by scanning a gold nano-particle with the spot and registering the stimulation light scattered by the gold nano-particle. Correspondingly, the respective STED microscope has to be operated in a scattered light mode, and the gold nano-particle has to be arranged at the location of the respective sample for which the aberration-induced imaging errors shall be compensated. Practically, the gold nano-particles have only been arranged on the front side and the back side of a sample to demonstrate the functionality of the method.

A method of correcting aberrations in the STED microscopy by means of an adaptive optic, in which a metric is used which combines image sharpness and image brightness, is known from WO 2014/029978 A1. This metric is maximized or minimized by operating a light modulator which is an SML or a deformable mirror. The image sharpness can only be determined after imaging the sample into an image. The image brightness depends on the concentration and the density of fluorescence makers by which a structure of interest in the sample is marked. The respective maximum or minimum of the metric combining the image brightness and image sharpness thus only has a local meaning and cannot be compared to maxima or minima in other areas of the sample.

A method of aligning a donut-shaped stimulation light focus and a spot-shaped excitation light focus with respect to one another, in which an offset between an STED image and a lifetime image of a florescent nano-bead is determined and removed, is known from Yifan Wang et al.: A 3D Aligning Method for Stimulated Emission Depletion Microscopy Using Fluorescence Lifetime Distribution, Microscopy Research and Technique 77:935-940, August 2014. Practically, the offset between the center of a normalized spatial intensity distribution of the fluorescent light from the nano-bead and the center of a normalized spatial lifetime intensity distribution of the fluorescent light from the nano-bead are determined and compensated.

For adjusting a corrected adjustment of a STED microscope in which an intensity maximum of excitation light and an intensity minimum of STED light coincide in a focus of an objective, it is known from WO 2018/042056 A1 to scan a structure in a sample, which is marked with a fluorescence dye, with the intensity maximum of the excitation light to produce pictures of the sample comprising images of the structure with different intensities of the fluorescence inhibition light. Then, an offset between positions of the images of the structure in the pictures produced is calculated and compensated.

There still is a need of methods of correcting aberration-induced imaging errors of an optical system which allow for a correction of the imaging errors for different areas of a sample during the continuing use of the imaging system or the laser scanning microscope for measuring or imaging the respective sample.

SUMMARY OF THE INVENTION

The present invention relates to a method of correcting aberration-induced imaging errors of an optical system including an objective and an adaptive optic in a beam path through the objective, the method comprising selecting light and a sample such that the light, in acting upon the sample, either reduces a measurement signal from the sample, or leads a measurement signal from the sample towards a saturation value from below, wherein a relative variation of the measurement signal depends on an intensity of the light. The method further comprises registering the measurement signal from a focal area of the optical system in the sample over a first period of time to determine a first measurement value, registering the measurement signal from the focal area of the optical system in the sample over a second period of time to determine a second measurement value, and focusing the light into the focal area in the sample by means of the optical system over a third period of time, wherein either the first period of time is at least partially earlier than the second period of time, or the second period of time is at least partially later than the first period of time, or the first period of time is at least partially earlier than the second period of time and the second period of time is at least partially later than the first period of time, wherein the third period of time at least partially overlaps with at least one of the first period of time, the second period of time, and an intermediate period of time arranged in between the first period of time and the second period of time. The method further comprises determining a measure value which is a strictly monotonically increasing or decreasing function of the relative variation of the measurement signal from the first measurement value and the second measurement value, and controlling the adaptive optic using the measure value as a metric that is to be optimized by altering the controlling.

The present invention also relates to a method of correcting aberration-induced imaging errors of an optical system including an objective and an adaptive optic in a beam path through the objective, the method comprising selecting first light, second light and a sample such that the first light in acting upon the sample excites a first measurement signal from components of the sample at a first transition probability which depends on an intensity of the first light with a first power, and that the second light in acting upon the sample excites the first or a second measurement signal from the same components of the sample at a second transition probability which depends on an intensity of the second light with a second power, wherein the first power and the second power differ by at least 1. The method further comprises focusing the first light, by means of the optical system, into a focal area of the optical system in the sample, and registering the first measurement signal from the focal area, which is excited by the first light, over a first period of time to determine a first measurement value, focusing the second light, by means of the optical system, into the focal area in the sample, and registering the first or second measurement signal from the focal area in the sample, which is excited by the second light, over a second period of time to determine a second measurement value, determining a measure value which is a strictly monotonically increasing or decreasing function of a relative variation of the first measurement signal or of a relative difference between the first and the second measurement signal from the first measurement signal and the second measurement signal, and controlling the adaptive optic using the measure value as a metric that is to be optimized by altering the controlling.

The present invention also relates to a method of correcting aberration-induced imaging errors of an optical system including an objective and an adaptive optic in a beam path through the objective, the method comprising selecting light and a sample such that the light, in acting upon the sample, either reduces a measurement signal from the sample, or leads a measurement signal from the sample towards a saturation value from below, wherein a relative variation of the measurement signal depends on an intensity of the light. The method further comprises providing the light with a temporal light modulation of its intensity and focusing the light into a focal area in the sample by means of the optical system, registering the measurement signal from the focal area of the optical system in the sample with temporal resolution, determining a phase shift between the light modulation and a signal modulation of the measurement signal as a measure value which is a strictly monotonically increasing or decreasing function of the relative variation of the measurement signal, and controlling the adaptive optic using the measure value as a metric that is to be optimized by altering the controlling.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components of the drawings are not necessarily to scale, emphasize instead being placed upon clearly illustrating the principles of the present invention. In the drawings, like reference numerals designate corresponding parts throughout the several views.

DETAILED DESCRIPTION

Figure 1:
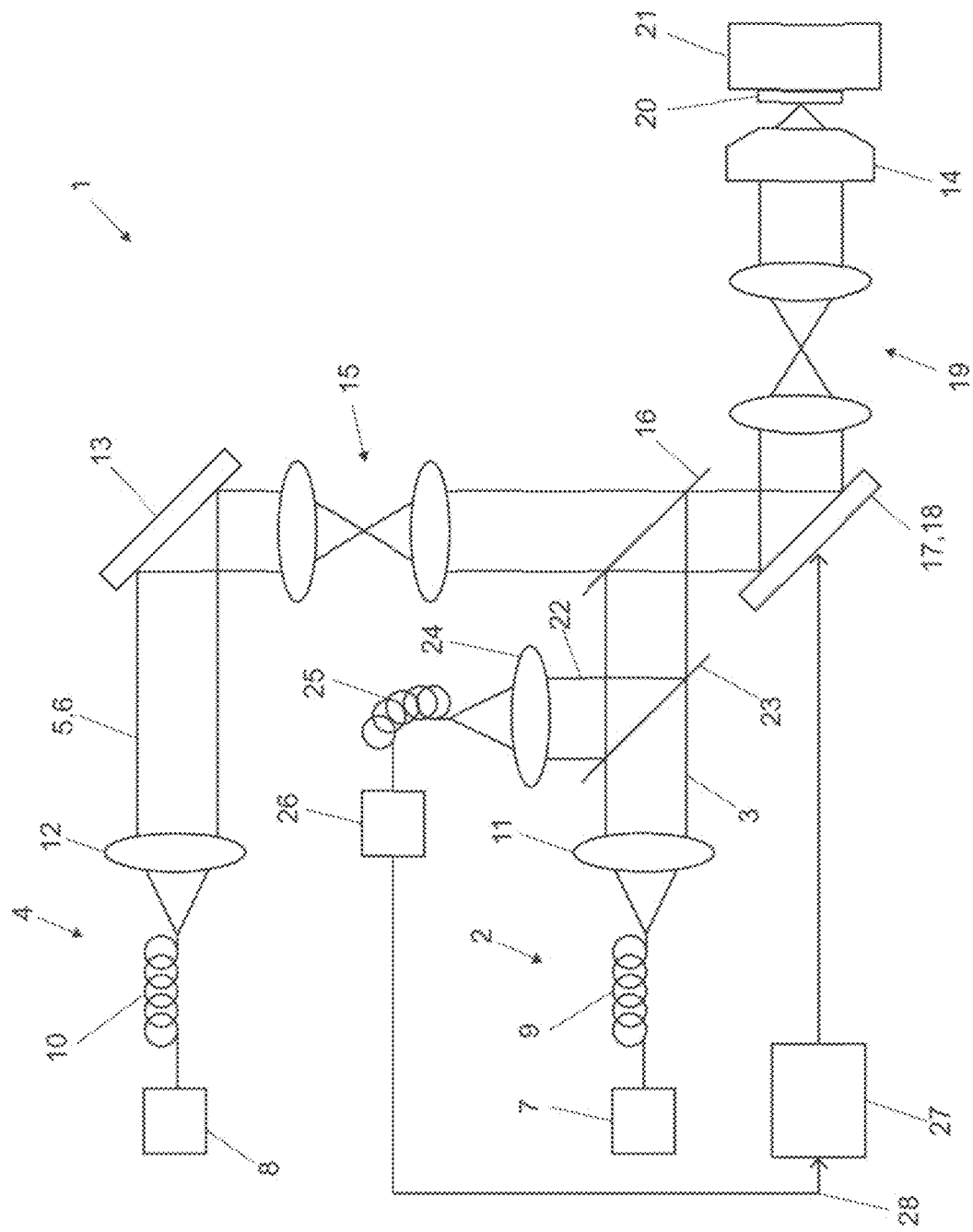
FIG. 1 shows a laser scanning microscope.

The present disclosure relates to a metric which is a measure of the quality of the focus in illuminating a sample with light. Aberrations which may, for example, occur in microscopy may be corrected by means of this metric. This is achievable in that the distribution of the light for illuminating the sample is adjusted by means of an adaptive optic such that the metric is optimized. For this purpose, the sample is at first illuminated with the light with a given adjustment of the adaptive optic, whereby a measurement signal from the sample is influenced in that the light, for example, results in an emission of fluorescence radiation. Afterwards, the measurement signal is detected with temporal resolution and, for the subsequent calculation, divided up in at least one early and one late period of time. From the ratio of the measurement values of the measurement signal for the two periods of time, for example the ratio of early and late photons of the fluorescence light, a measure value is calculated which is a measure of the quality of the focus. This measure value is optimized by repeated adjustment of the adaptive optic, for example of an adaptive mirror, whereby the aberrations are corrected. An equivalent measure value may be determined in the frequency space.

In a first method of correcting aberration-induced imaging errors of an optical system including an objective and an adaptive optic arranged in a beam path through the objective according to the present disclosure, light and a sample are selected such that the light in acting upon the sample either reduces a measurement signal, or leads a measurement signal towards a saturation value from below, wherein a relative variation of the measurement signal depends on the intensity of the light. The measurement signal originating from a focal area of the optical signal in the sample is registered over a first period of time in order to determine a first measurement value, and over a second period of time in order to determine a second measurement value. Over a third period of time, the selected light is focused into the focal area in the sample by means of the optical system. The first period of time is at least partially earlier than the second period of time and/or the second period of time is at least partially later than the first period of time, and the third period of time at least temporally partially overlaps with the first period of time and/or the second period of time and/or an intermediate period of time arranged in between. From the first measurement value and the second measurement value, a measure value which is a strictly monotonically increasing or decreasing function of the relative variation of the measurement signal is determined and used in controlling the adaptive optic as a metric that is to be optimized by altering the controlling.

In carrying out this first method according to the present disclosure, the aberration-induced imaging errors to be corrected have an effect in focusing the selected light by means of the optical system into the focal area of the sample. When the imaging errors occurring in this focusing are corrected, they are also corrected at the time when the focal area is imaged by means of the imaging system.

If the selected light is focused with the optical system into the focal area in the sample in the third period of time, the aberration-induced imaging errors to be corrected have the effect that the intensity of the selected light is reduced as compared to its maximum value without the aberration-induced imaging errors, i.e. to the so-called Strehl-number.

Correspondingly, the relative variation of the measurement signal from the sample that is caused by the selected light is also reduced.

The above relative definitions of the first, second and third periods of time have the result that the first measurement value is to a lesser extend influenced by the selected light focused into the focal area in the third period of time than the second measurement value.

Due to the above selection of the light and the sample and the above relative definitions of the first, second and third period of time with respect to one another, the first and the second measurement values in a same way depend on local properties of the sample in the respective focal area. Thus, the determination of the measure value by means of forming a quotient of the second measurement value determined as an integral of the measurement signal over the second period of time and the first measurement value determined as an integral of the measurement signal over the first period of time results in a normalization with respect to the starting value of the measurement signal, i.e. in an independence of the absolute height, i.e. the level, of the measurement signal. However, the measure value remains dependent on the intensity of the selected light in the focal area.

Thus, the measure value is comparable over varying levels of the measurement signal. This means that the measure value can be optimized over neighboring areas of a sample, even if the level of the measurement signal varies over these neighboring areas of the sample. Thus, the measure value may continuously be optimized, particularly in scanning the sample with the focal area. The optimization of the measure value is not only possible with a constant position of the focal area in the sample over the alterations of the controlling of the adaptive optic. However, this does not mean that the metric which is to be optimized according to the present disclosure, i.e. the measure value, has the same value for all positions of the focal area in the sample. Instead, this is for sure not the case, because the sample itself is a cause of aberrations which will at least vary in axial direction along the optical axis of the objective, i.e. over the depth of the sample. However, the optimized measure value will only vary little between laterally neighboring positions of the focal area in the sample so that an optimization for a directly neighboring position of the focal area in the sample may start with the controlling of the adaptive optic which has resulted in an optimization of the metric according to the present disclosure in the previous position of the focal area.

That the dependency on the intensity of the selected light in the focal area does not get lost in determining the measure value is ensured in that, both if the selected light reduces the measurement signal and if the selected light leads the measurement signal towards a saturation value from below, the first and the second measurement values both neither linearly nor with any other equal power other than zero directly depend on the intensity of the selected light.

This has the result that the measure value, in the method according to the present disclosure, either increases or decreases with the intensity of the selected light in the focal area. Correspondingly, the measure value, as a metric to be optimized by controlling the adaptive optic, is to be maximized or minimized to maximize the intensity of the light in the focal area. This maximum intensity is achieved exactly at that time when the aberration-induced imaging errors are removed. Thus, the measure value is suitable as a metric to be optimized by altering the controlling of the adaptive optic in the method according to the present disclosure to achieve the goal of correcting the aberration-induced imaging errors.

The formation of a quotient of the second measurement value determined as an integral of the measurement signal over the second period of time and of the first measurement value determined as an integral of the measurement signal over the first period of time, which has already been provided as an example and which results in a normalization with respect to the starting value of the measurement signal, is, for example, suited for determining the measure value, if the selected light reduces the measurement signal from the sample. With this effect of the selected light on the measurement signal, even the reciprocal value of this quotient is suited as a measure value which is then not to be minimized but to be maximized.

If the selected light leads the measurement signal from the sample towards a saturation value from below, a normalization of an absolute variation of the measurement signal to the saturation value is advantageous in order to determine the measure value. This normalization may approximately be achieved in that the measure value is determined by formation of a quotient of the first measurement value and the second measurement value.

However, in the method according to the present disclosure, the measure value which is determined from the first measurement value and the second measurement value and which is used as the metric to be optimized by altering the controlling of the adaptive optic, does not need to be a quotient, particularly no direct quotient of these two measurement values. Thus, it is principally harmless, if the denominator or numerator of the quotient also includes a further factor by which the measurement value is multiplied or an offset which is added to the measurement value. Further, the denominator may comprise a difference and/or the numerator of the quotient may comprise a sum of the measurement values, or vice versa. Generally, any measure value is suitable which is a strictly monotonically increasing or decreasing function of the relative variation of the measurement signal. It has to be understood that this function only needs to have these properties in the relevant range of the measurement values occurring.

Any such measure value reaches an extremum at the same controlling of the adaptive optic as the direct quotient of the second measurement value determined as an integral of the measurement signal over the second period of time and the first measurement value determined as an integral of the measurement signal over the first period of time.

Generally, it is advantageous, if the measure value is a continuous and thus injective function of the relative variation of the measurement signal. However, this is not at all necessary.

In altering the controlling of the adaptive optic for optimizing the metric according to the present disclosure, one may practically proceed as follows. An old measure value is determined from the first measurement value and the second measurement value. The controlling of the adaptive optic is altered in an alteration direction. The measurement signal is once again determined over an equal first period of time and an equal second period of time, wherein the light is focused into the focal area in the sample over an equal third period of time to determine a new first measurement value and a new second measurement value. A new measure value is determined from the new first measurement value and the new second measurement value, and a difference between the new measure value and the old measure value is determined. Depending on the direction of the difference, the controlling of the adaptive optic is altered once again in the previous or in another, particularly in an alteration direction opposite to the previous alteration direction. If the metric according to the present disclosure, due to the basic dependency of the variation of the measurement signal on the intensity of the light selected, is to be maximized, the controlling of the adaptive optic is to be altered once again in the previous alteration direction at the time when the new measure value is higher than the old measure value, and, in once again altering the controlling of the adaptive optic, the altering direction has to be altered at the time when the new measure value is lower than the old measure value. With a metric according to the present disclosure to be minimized, the opposite applies.

The steps of once again registering the measurement signal over an equal first period of time and an equal second period of time, wherein the light is focused into the focal area in the sample over an equal third period of time to determine a new first measurement value and a new second measurement value, of determining a new measure value from the new first measurement value and the new second measurement value, of determining a difference between the new measure value and the old measure value, and of once again altering the controlling of the adaptive optic in the previous or in another alteration direction depending on the direction of the difference may executed for at least one further time, wherein each time the measure value determined in a previous execution of the steps is used as the old measure value in the present execution of the steps. The steps mentioned may be repeated so often that an controlling of the adaptive optic in the respective altering direction is achieved at which the measure value reaches an extremum, i.e. either a minimum or a maximum. As a criterion for reaching the extremum, it may, for example, be applied that the difference between the new measure value and the old measure value falls short of a threshold value related to the last alteration of the controlling of the adaptive optic, or that the difference between the new measure value and the old measure value repeatedly changes its direction over the last repetitions of the steps.

Further, in each repetition of the steps, the size of the alteration of the controlling of the adaptive optic may depend on the size of the difference between the new measure value and the old measure value in at least one of the previous steps. Thus, overshooting of the searched for extremum of the respective metric due to a too big alteration of the controlling of the adaptive optic may be avoided.

The measurement signal which, in the method according to the present disclosure, is influenced by means of the light selected and which is integrated for obtaining the first and the second measurement values may particularly be measurement light emitted out of the sample. This measurement light may be imagined by means of the optical system onto a detector registering and potentially directly integrating the measurement light. In imaging the measurement light onto the detector the aberration-induced imaging errors of the optical systems to be corrected have an effect. However, depending on the way of registering the measurement light, this additional effect may be irrelevant. This, for example, applies in all cases in which the detector registers the measurement light from the focal area without spatial resolution.

The alteration direction in which the controlling of the adaptive optic is altered in carrying out the method according to the present disclosure may be selected from different alteration directions. This particular includes the alteration directions in which a spherical aberration, a defocus, a stigmatism and a coma of the optical system can be compensated. Which alteration of the controlling of the adaptive optic provides a particularly high contribution to reaching the respective extremum of the metric according to the present disclosure depends on the respective optical system and particularly on the respective sample. Often, it is sufficient to only compensate one of the aberrations mentioned to keep the imaging errors of the optical system very small. This may particularly be the spherical aberration.

The light whose intensity in the focal area has an effect on the temporal variation of the measurement signal may be selected from such light that results in an exponential decrease of the measurement signal towards zero over time, or that results in exponentially leading the measurement signal towards the saturation value from below over time. If, for example, the measurement signal is fluorescence light which is emitted by fluorescence dyes in the sample, the selected light may be excitation light which excites the fluorescence dyes in the focal area into a fluorescent state until the intensity of the resulting fluorescence light from the fluorescent dyes approaches the saturation value.

If the fluorescence dyes, by excitation light which is provided in addition to the light, are excited in the focal area into a fluorescent state out of which they emit the fluorescence light as measurement light, the selected light may be stimulation light which stimulates the fluorescence dyes for a stimulated emission before the fluorescence dyes emit the fluorescence light. Then, the fluorescence light remaining after the influence of the stimulation light non-linearly depends on the intensity of the stimulation light. Practically, the additional excitation light together with the stimulation light may be focused by the optical system into the focal area in the sample. If an intensity distribution of the selected light has a central intensity minimum which coincides with a central intensity maximum of the excitation light in the focal area, intensity distributions of the excitation light and the stimulation light are present as they are also used in the STED microscopy. Thus, the method according to the present disclosure results in a correction of the aberration-induced imaging errors of the imaging system which have a negative effect on the spatially tightly limited effective point spread function in exciting the respective sample for fluorescence.

If, in carrying out the method according to the present disclosure, the third period of time then practically begins so much earlier than the first period of time and the intensity of the light in the intensity maxima of the intensity distribution of the stimulation light neighboring the central intensity minimum are so high that the measurement signal by more than 50%, preferable by more than 66% and even more preferable by more than 90% originates from surroundings of the intensity minimum whose dimensions in at least one spatial direction are smaller than a diffraction barrier at both wavelengths of the light and the fluorescence light, the method according to the present disclosure corrects the aberration-induced imaging errors for exactly these surroundings of the intensity minimum. Although these surroundings enclose but not include the intensity minimum which corresponds to the respective point of the sample measured in the STED microscopy, this also means a correction of the aberration-induced imaging errors for the respectively measured point of the sample. This correction is even highly specific for the respectively measured point of the sample, because the dimensions of the surroundings are already smaller than the diffraction limit at the wavelengths of the light and the fluorescence light.

As the demands on the excitation light and the stimulation light in carrying out the embodiment of the method according to the present disclosure described at last may completely correspond to the demands in STED microscopy, the method according to the present disclosure may be executed during the continued execution of a STED-microscopic measurement or even of a STED microscopic imaging. Practically, the photons of the fluorescence light registered for the respective measurement or imaging may be used for the execution of the method according to the present disclosure, if they are registered with spatial resolution such that they can be assigned to the first and second periods of time. Of course, the method according to the present disclosure may also be executed prior to using the optical system for actually imaging the sample.

In those embodiments of the method according to the present disclosure equal to the STED microscopy, the measure value determined as a quotient whose denominator is the first measurement value and whose numerator is the second measurement value is to be used as a metric to be minimized. This means that at the time when the respective new measure value determined as a quotient is smaller than the respective old measure value determined as a quotient, the controlling of the adaptive optic has once again to be altered in the previous alteration direction, because the metric getting smaller indicates aberration-induced imaging errors getting smaller.

Thus, a difference from those method becomes apparent which use the brightness of an image taken, i.e. the intensity of the fluorescence light remaining after the influence of the stimulation light, as a metric to be maximized for adjusting a STED microscope. In its embodiment equaling STED microscopy, the method according to the present disclosure instead aims at that the stimulation light inhibits the emission of fluorescence light in the center of the focal area to an as high extent as possible. This requires the maximum intensity of the stimulation light in the focal area which is only achieved without aberration-induced imaging errors. The remaining emission of fluorescence light from the intensity minimum of the intensity distribution of the stimulation light, which may even increase with aberration-induced imaging errors becoming smaller, does not play a role in disturbing the function of the method according to the present disclosure.

In the method according to the present disclosure, the respective first period of time, the respective second period of time, and even the respective third period of time may independently from one another be a continuous period of time or be composed of partial periods of time at intervals of time. That the third period of time is composed of partial periods of time may, for example, mean that the light is directed into the focal area in a plurality of very quick successive pulses which are not resolved in registering the measurement signal. That the first period of time and/or the second period of time are composed of partial periods may mean that the measurement signal from the sample is respectively registered within several partial periods of time temporarily following to one another, with dead times of the registration of the measurement signal being present in between.

In a special embodiment of the method according to the present disclosure, the fact that the first, the second and the third period of time are composed of partial periods of time means that the focal area is slightly shifted in the sample after one partial area of each the first, the second and the third period of time, before a second and afterwards potentially further partial periods of time of the first period of time, the second period of time and the third period of time follow. In this way, in registering and, where appropriate, in integrating the measurement signal, it is averaged over a spatial area of the sample. This has proven to be advantageous particularly in the STED microscopy close embodiment of the method according to the present disclosure to average out effects of a concentration of the fluorescence dyes in the sample fluctuating at a high spatial frequency on the measure value used as the metric.

In other words, in the method according to the present disclosure, registering and, where appropriate, integrating the measurement signal over equal first and equal second periods of time, wherein the light is focused into the focal area in the sample over an equal third period of time, may be executed for several image points to obtain the respective first measurement value and the respective second measurement value.

In a laser scanning microscope according to the present disclosure comprising a first light source for excitation light, a second light source for stimulation light, an objective and a correction device for correction aberration-induced imaging errors, which includes an adaptive optic in a beam path through the objective, the correction device is configured for executing the flowing steps of the method according to the present disclosure: Registering the measurement signal over the first period of time and over the second period of time, wherein the stimulation light is focused in the focal area in the sample over the third period of time as that light that reduces the measurement signal in acting upon the sample, in order to determine the first measurement value and the second measurement value; determining the measure value from the first measurement value and the second measurement value; and using the measure value in controlling the adaptive optic as a metric to be optimized by altering the controlling.

The adaptive optic of the laser scanning microscope according to the present disclosure may, for example, include at least one of an adaptive mirror, a controllable micro mirror array, and an SLM (spatial light modulator). In the STED microscopy close embodiment of the method according of the present disclosure, particularly the SLM may at the same time also be used for wave front shaping of the stimulation light in such a way that the stimulation light forms the intensity distribution comprising the central intensity minimum in the focal area.

In a further method according to the present disclosure of correcting aberration-induced imaging errors of an optical system including an objective and an adaptive optic in a beam path through the objective, first light, second light and a sample are selected such that the first light, in acting upon the sample, excites a first measurement signal from components of the sample at a first transfer probability which depends on an intensity of the first light at a first power, and that the second light, in acting upon the sample, excites the first or a second measurement signal from the same components of the sample at a second transfer probability which depends on an intensity of the second light at a second power, wherein the first and second powers differ by at least one. Then, the first light, by means of the optical system, is focused into a focal area of the optical system in the sample, wherein the first measurement signal from the focal area, which is excited by the first light, is registered over a first period of time to determine a first measurement value. Further, the second light, by means of the optical system, is focused into the focal area in the sample, wherein the first or second measurement signal from the focal area in the sample, which is excited by the second light, is registered over a second period of time to determine a second measurement value. Then, a measure value which is a strictly monotonically increasing or decreasing function of a relative variation of the first measurement signal or a relative difference between the first and second measurement signals is determined from the first measurement value and the second measurement value and used in controlling the adaptive optic as a metric which is to be optimized by altering the controlling.

In this method according to the present disclosure, the different dependencies of the first and second transfer probabilities on the intensity of the first and second lights in exciting the respective measurement signal are utilized in determining a measure value which is used as a metric to be optimized in controlling the adaptive optic. Even in this method according to the present disclosure, the measure value which is a strictly monotonic increasing or decreasing function of the relative variation of the first measurement signal or the relative difference between the first and the second measurement signals is, at the simplest, determined by forming a quotient between the first and the second measurement values. Because the first and the second transfer probabilities depend on the intensity of the light at first and second powers which differ by at least 1, whereas both the intensities of the first and second light depend on the aberration-induced imaging errors in a same way, this quotient is depending on the imaging errors. On the other hand, all other influences on the two measurement values result in a constant factor in the quotient, which does not vary with determining the first and the second measurement values for the respective same focal area with the aberration-induced imaging errors. This generally even applies if the first light excites other components of the sample in the same or even in another focal area for emission of the first measurement signal than the second light. However, in that, in this method according to the present disclosure, the respective signal is excited by the first or the second light in the same focal area from the same components of the sample, the measure value becomes essentially independent on the observed position location of the sample. The measurement signal excited by the second light may be the same measurement signal as the measurement signal excited by the first light, which may simplify the execution of the method according of the present disclosure. However, it may also be a second measurement signal, for example measurement light of another wavelength.

Practically, the first light may excite the first measurement signal from the components of the sample by a single photon process whereas the second light excites the first or the second measurement signal from the same components of the sample by a multiphoton process.

Further preferred embodiments of this further method according to the present disclosure correspond to those of the method according to the present disclosure which has been described above at first.

In an even further method according to the present disclosure of correcting aberration-induced imaging errors of an optical system including an objective and an adaptive optic in the beam path through the objective, light and a sample are selected in the same way as in the method according of the present disclosure described above at first, i.e. such that the light, in acting upon the sample, either reduces a measurement signal from the sample or leads a measurement signal from the sample towards a saturation value from below, wherein a relative variation of the measurement signal depends on an intensity of the light. In this method, in contrast to the two methods according to the present disclosure described above, the light is provided with a temporal light modulation of its intensity and focused into a focal area in the sample by means of the optical system. The measurement signal from the focal area of the optical system in the sample is registered with temporal resolution. Then, a phase shift between the light modulation and a signal modulation of the measurement signal is determined as a measure value which is a strictly monotonically increasing or decreasing function of the relative variation of the measurement signal and used in controlling the adaptive optic as a metric which is to be optimized, i.e. minimized or maximized by altering the controlling.

This method according to the present disclosure is the equivalent in the frequency space to the method according to the present disclosure described at first. The phase shift between the light modulation and the signal modulation is depended on the aberration-induced imaging errors in a same way as the quotient of the second measurement value and the first measurement value in the method according to the present disclosure described above at first.

Most of the above referred embodiments of the method according to the present disclosure described at first are thus also preferred embodiments of this method according to the present disclosure.

Now referring in greater detail to the drawings, the laser scanning microscope 1 according to the present disclosure depicted in FIG. 1 is based on a STED microscope and correspondingly comprises, besides a first light source 2 for excitation light 3, a second light source 4 for light 5 in the form of stimulation light 6 which removes an excitation by means of the excitation light 3. Each of the two light sources 2 and 4 includes a laser 7 or 8, a polarization maintaining optical fiber 9 or 10 and a collimation optic 11 or 12 for the excitation light 3 or stimulation light 6 emerging out of the optical fiber 9 or 10. In the beam path of the stimulation light 6, an additional SLM 13 is arranged for wave front shaping so that the stimulation light 6 forms an intensity distribution with a central intensity minimum in a focal area of an objective 14. Behind the SLM 13 and downstream of a further optic 15, the stimulation light 6 is merged with the excitation light 3 by means of a dichroic beam splitter 16. Via a deformable mirror 17 as an adaptive optic 18 and an even further optic 19, the excitation light 3 and the stimulation light 6 are coupled into the objective 14 which focuses the excitation light 3 and the stimulation light 6 together into a focal area in a sample 20. The optics 15 and 19 are designed such that the deformable mirror 17 and the SLM 13 are positioned in planes which a conjugated which respect to an entrance pupil of the objective 14. The position of the focal area, into which the excitation light 3 and the stimulation light 6 are focused, can be shifted within the sample 20 by means of a scanner 21. In FIG. 1, the scanner 21 is indicated as a movable sample stage. However, the scanner 21 may be designed differently and especially such as to move the excitation light 13 and the stimulation light 6 with respect to the objective 14, particularly to tilt them about a center of the entrance pupil of the objective 14. Fluorescence light 22 emitted out of the focal area in the sample 20—due to the excitation of fluorescence dyes which are present there by means of the excitation light 3—is coupled out of the beam path of the excitation light 3 by means of two dichroic beam splitters 23, focused into a multimode optical fiber 25 by means of an optic 24 and forwarded through the multimode light fiber guide 25 towards a temporally resolving detector 26. In the laser scanning microscope 1 according to the present disclosure, the deformable mirror 17 is controlled by a controller 27 as an adaptive optic arranged in a beam path through the objective 14, to which a measurement signal 28 from the detector 26 indicating the fluorescence light is supplied. Instead of the deformable mirror 17, the adaptive optic could also be provided by an SLM, a micro mirror array or in any other way known to one skilled in the arts.

Figure 2:
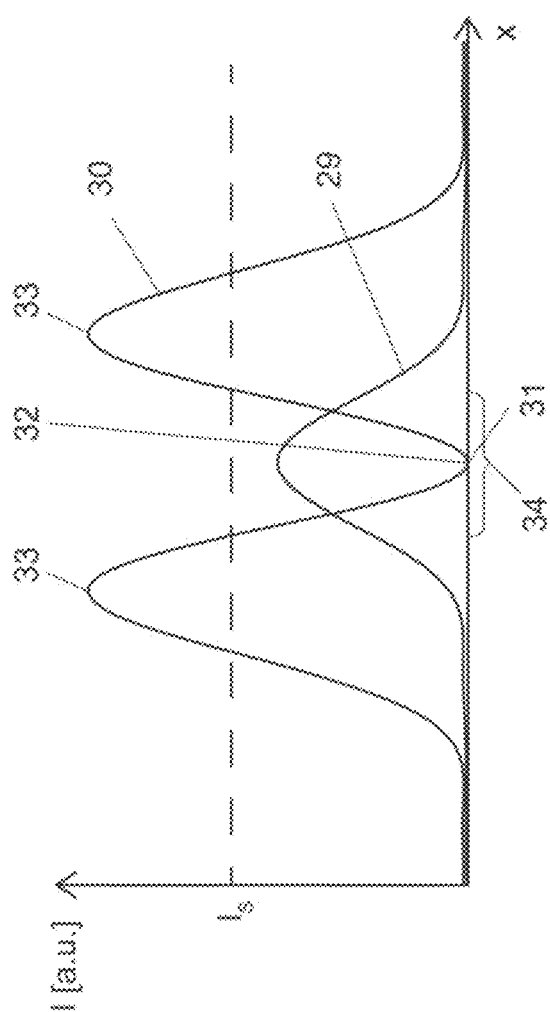
FIG. 2 shows light intensity distributions of excitation light and stimulation light in a focal area of an objective of the laser scanning microscope according to FIG. 1.

FIG. 2 shows light intensity distributions 29 and 30 of the excitation light 3 and the stimulation light 6 along a section in x-direction through the center of the focal area. The intensity distribution 29 of the excitation light is that one of a diffraction limited spot. The, from a spatial point of view, donut-shaped intensity distribution 30 of the stimulation light comprises an intensity minimum in the form of a zero point 32 in the center 31, which, in the section according to FIG. 2, is delimited by intensity maxima 33. In the intensity maxima 33, the intensity of the stimulation light exceeds a saturation intensity $I_s$, which has the result that the excitation of the fluorescence dyes due to the excitation light 3 are completely reset. Correspondingly, the fluorescence light 22 registered by the detector 26 according to FIG. 1 may be assigned to the surroundings 34 of the zero point 32, whose dimensions are below the diffraction barrier. However, this only applies to the fluorescence light 22 which is registered after the stimulation light 6 has removed the excitation due to the excitation light 3 outside of the surroundings 34 of the zero point 32.

Figure 3:
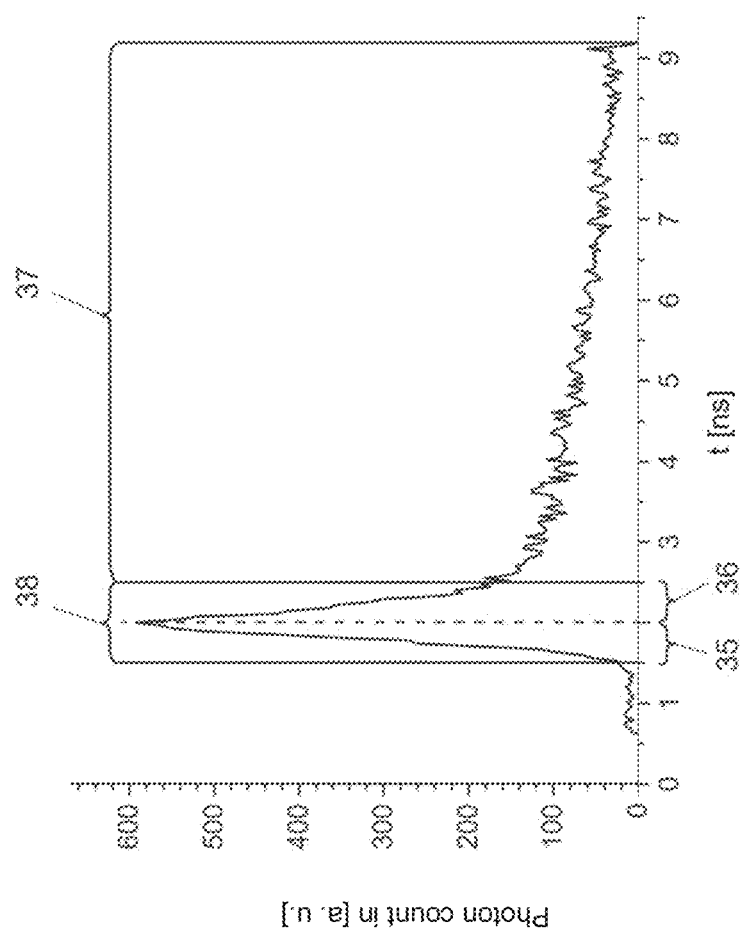
FIG. 3 is a histogram of photons of fluorescence light over the time, that is registered in the laser scanning microscope as a measurement signal.

FIG. 3 shows the points in time of the incidence of the individual photons of the fluorescence light 22 at the detector 26 according to FIG. 1 after one pulse 35 of the excitation light and the subsequent pulse 36 of the stimulation light. At first, the number of photons registered per time unit steeply increases due to the excitation by means of the excitation light 3 during the pulse 35. Then, it steeply decreases due to the influence of the stimulation light during the pulse 36. Then, photons of the fluorescence light 22 registered in a period of time 37 after the pulse 36 are those from the surroundings 34 of the zero point 32. In the method according to the present disclosure, the number of the photons of the fluorescence light 22 registered in the period of time 37 is related to a number of photons of the fluorescence light 22 which are registered during a previous period of time 38. This previous period of time 38 is here also designated as a first period time, whereas the period of time 37 is designated as a second period of time. According to FIG. 3, the pulses 35 and 36 fall into the first period of time 38. According to the present disclosure, the step of relating the photons registered in the second period of time 37 to the photons of the fluorescence light 22 registered in the first period of time 38 is executed by determining a measure value, particularly by forming a quotient of the photons registered in the second period of time 37 and the photons registered in the first period of time 38. The present disclosure is based on the conclusion that this measure value has an extremum when the controller 27 controls the adaptive optic 18 such that aberration-induced imaging errors of the optical system of the laser scanning microscope 1 including the objective 14 are exactly compensated by the adaptive optic 18. Aberration-induced imaging errors of the optical system of the laser scanning microscope 1 according to FIG. 1 have an effect on the intensities of the excitation light 3 and the stimulation light 6 in the focal area in the sample 20 such that the intensities get smaller with increasing imaging errors. Thus, due to increasing imaging errors the intensity of the excitation light and also the excitation of fluorescence dyes in the sample 20 and thus of the fluorescence light 22 decreases. However, this decrease cannot be differentiated from other decreases of the intensity of the fluorescence light 22, like for example due to a spatial variation of the concentration of the fluorescence dye or a decrease caused by bleaching of the fluorescence dyes. However, when viewing the relative effect of the stimulation light 6 onto the fluorescence dyes previously excited by the excitation light 3, which is indicated by the measure value determined from the photons registered in the two periods of time 37 and 38, this effect is only dependent on the intensity of the stimulation light 6. The less photons are registered in the second period of time 37 as compared to the photons in the first period of time 38, the more fluorescence dyes are de-excited by the stimulation light 6 before the second period of time 37, which is equivalent to that the intensity of the stimulation light is the higher and the aberration-induced imaging errors are the smaller. With reference to FIG. 2, the effect of aberration-induced imaging errors may also be explained in that the saturation intensity Is, with an overall reduced intensity distribution 30 of the stimulation light 6 due to aberration-induced imaging errors, is only exceeded at a higher distance to the zero point 32 and in that, correspondingly, more fluorescence light from the surrounding 34 of the zero point 32 remains.

Figure 4:
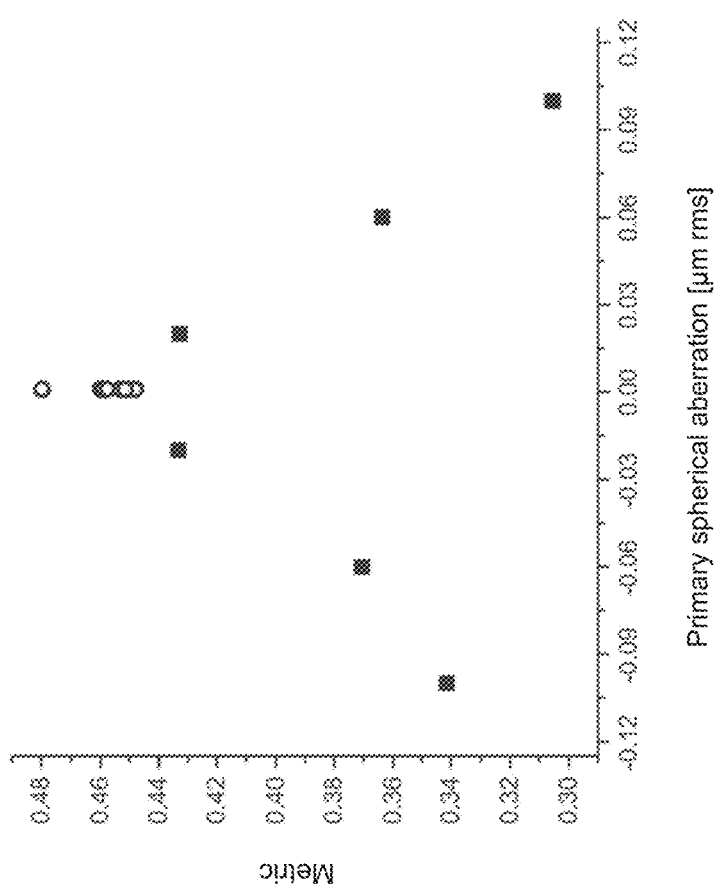
FIG. 4 shows a plot of a metric according to the present disclosure over different purposefully caused spherical aberrations (black squares) and over a free running optimization of the metric according to the present disclosure (white circles).

The metric plotted in FIG. 4 is the quotient of the photons of the fluorescence light 22 registered in the first period of time 38 divided by the photons of the fluorescence light 22 registered in the second period of time 37. Thus, the metric increases when relatively fewer photons are registered in the second period of time 37 than in the first period of time 38, because the stimulation light 3, due to an increased intensity, had a stronger reducing effect on the fluorescence light 22. The influence of six spherical aberrations which have been artificially introduced in the laser scanning microscope 1 according to FIG. 4 with the adaptive optic 18 are depicted (black squares). Independently on their signs, the increasing spherical aberrations result in increasing drops of the metric with respect to its maximum. Even at an artificially introduced aberration of zero, this maximum could be significantly increased by a free running optimization of the metric according to the present disclosure by means of altering the controlling of the adaptive optic 18 by the controller 27 according to FIG. 1 with respect to a starting situation (white circles). For FIG. 4, the metric was established in a 2D STED image of a layer of microspheres filled with dye of 400 nanometer size with the laser scanning microscope 1 according to the FIG. 1, wherein the photons of the fluorescence light 22 have been registered according to FIG. 3 with temporal resolution.

Figure 5:
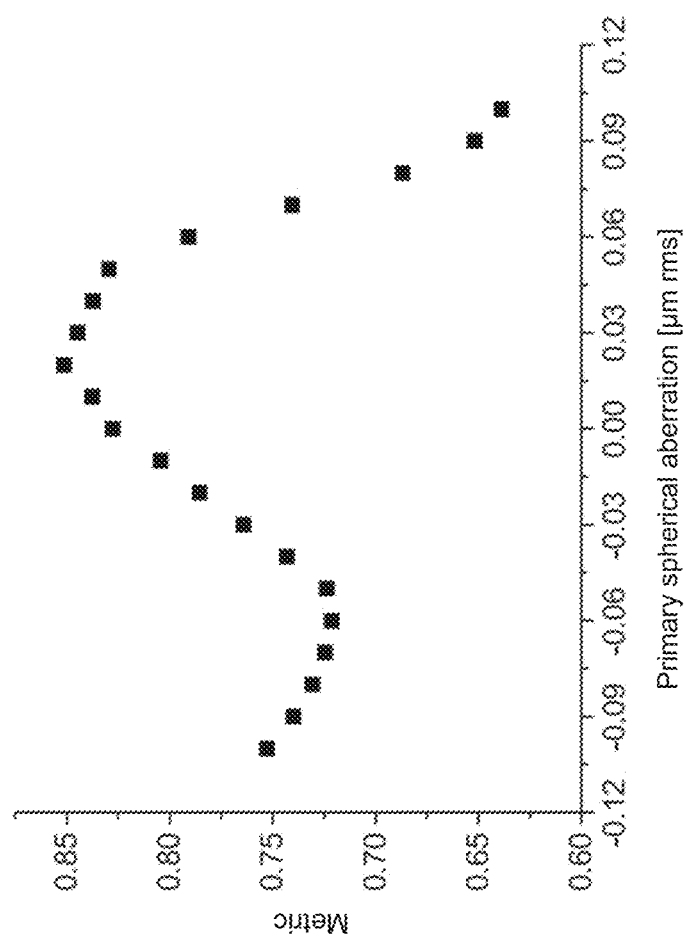
FIG. 5 is a plot of a metric according to the present disclosure over a spherical aberration of the optical system of the laser scanning microscope according to FIG. 1 in imaging microspheres filled with dye.
Figure 6:
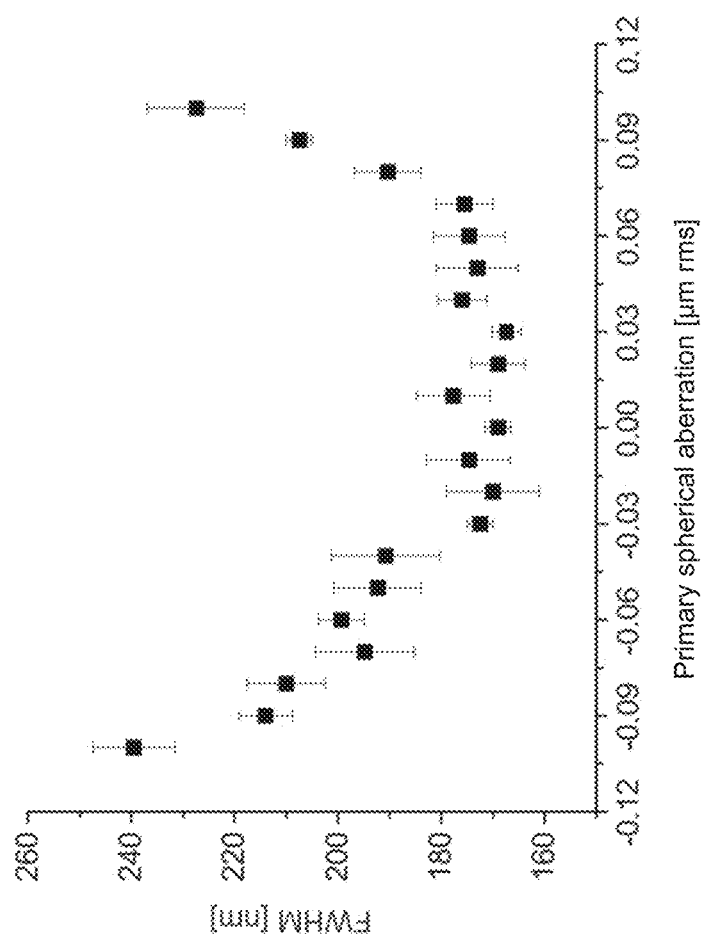
FIG. 6, in comparison to FIG. 5, shows the full width at half maximum of images of the microspheres filled with dye over the same spherical aberration.
Figure 7:
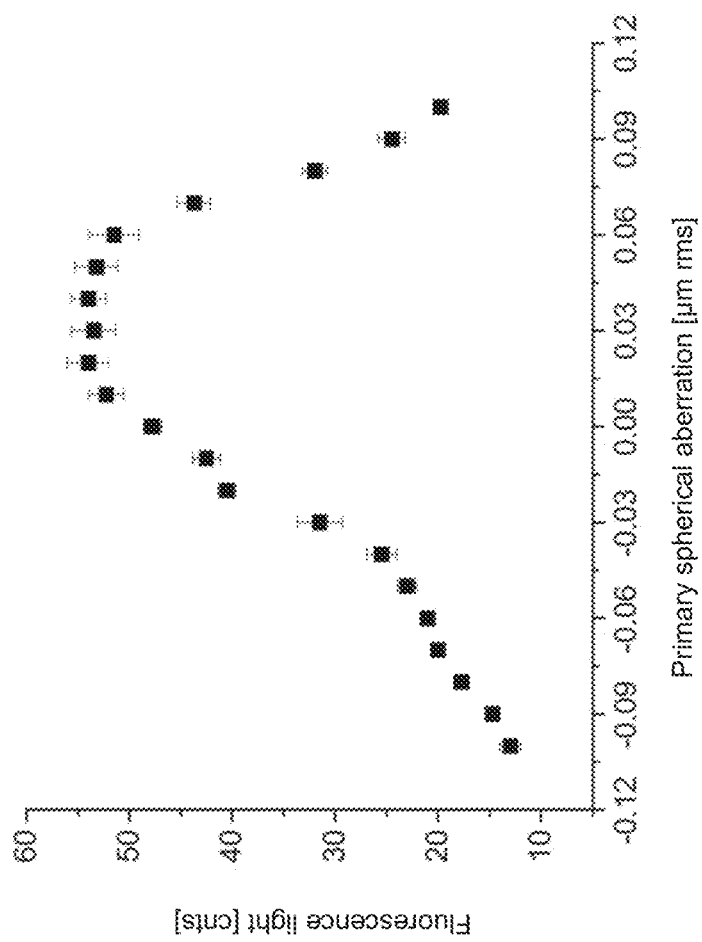
FIG. 7, in comparison to FIG. 5, shows the intensity of the fluorescence light from the microspheres filled with dye over the same spherical aberration.
Figure 8:
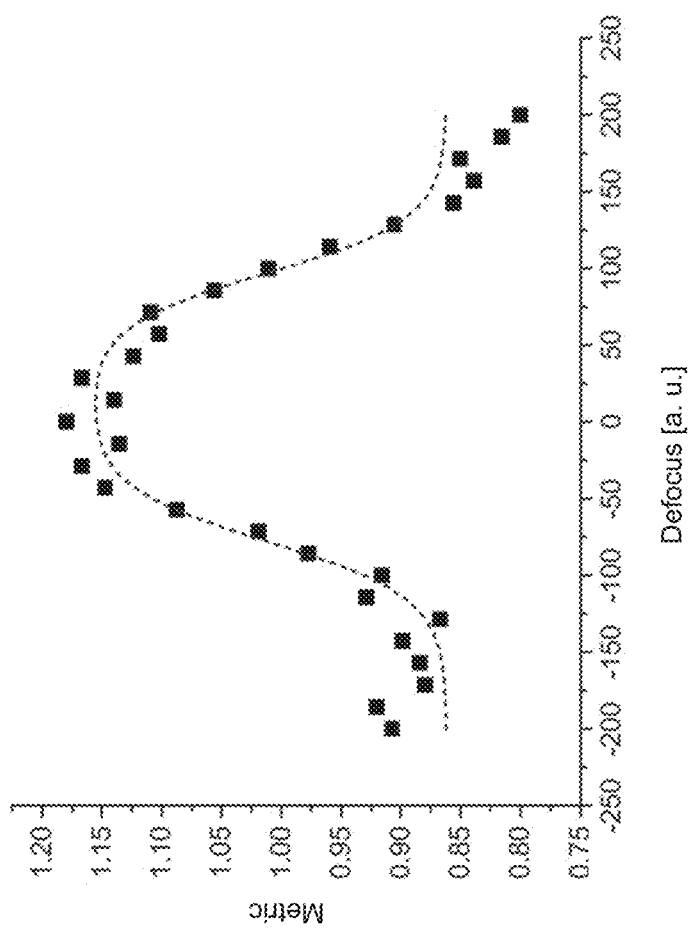
FIG. 8 shows the course of the metric according to the present disclosure over a defocus of the optical system of the laser scanning microscope according to FIG. 1.
Figure 9:
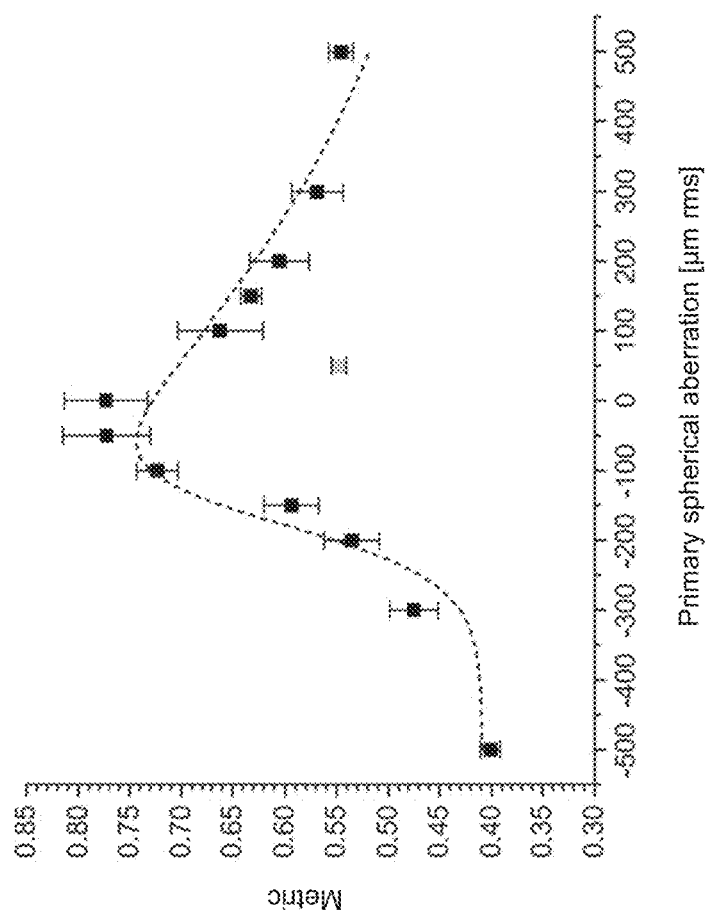
FIG. 9 shows the course of the metric according to the present disclosure over a spherical aberration of the optical system of the laser scanning microscope according to FIG. 1.
Figure 10:
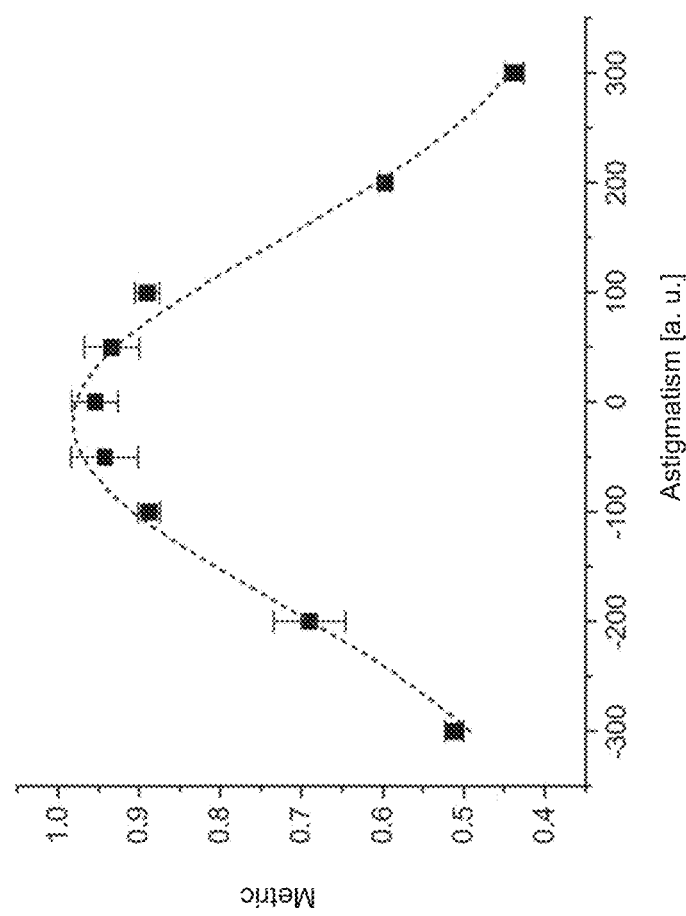
FIG. 10 shows the course of the metric according to the present disclosure over an astigmatism of the optical system of the laser scanning microscope according to FIG. 1.
Figure 11:
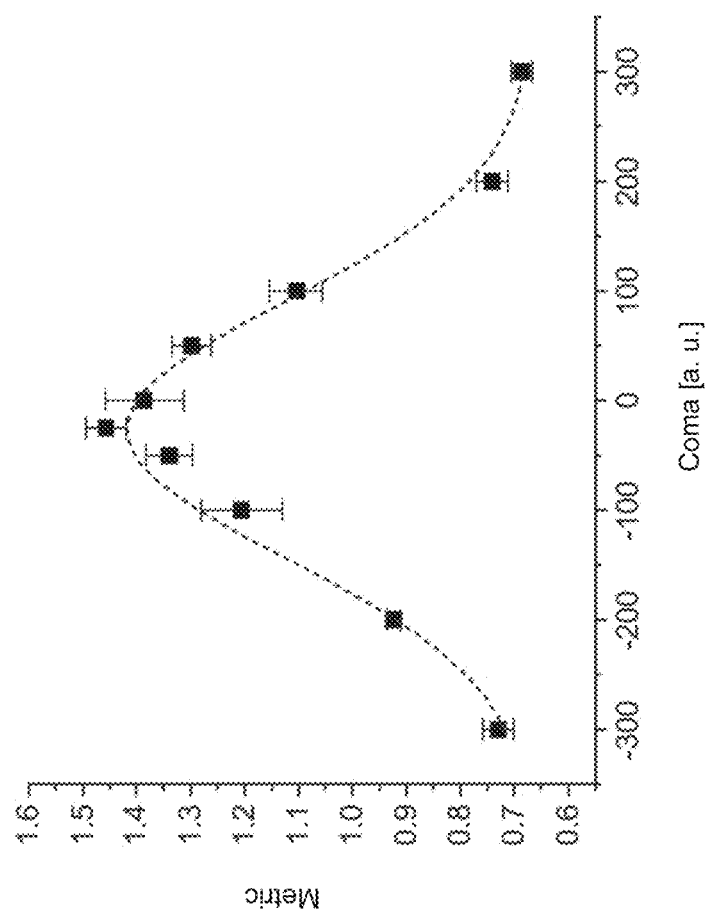
FIG. 11 shows the course of the metric according to the present disclosure over a coma of the optical system of the laser scanning microscope according to FIG. 1.

FIG. 5 is a plot of the same metric according to the present disclosure as in FIG. 4, wherein STED images of individual microspheres of 40 nanometer size filled with dye have been recorded for different spherical aberrations which have been purposefully introduced by means of the adaptive optic 18. FIG. 6 shows the corresponding full widths at half maximum of the images of the individual microspheres, and FIG. 7 shows the fluorescence light intensities from the individual microspheres, each time plotted over the same introduced aberrations. The comparison of FIGS. 5 to 7 shows that the maximum of the metric according to the present disclosure is achieved in FIG. 5 within a clearly broader minimum of the full width at half maximum in FIG. 6 and also within an even broader maximum of the intensity of the fluorescence light in FIG. 7. This is the background, why, in the optimization of the metric according to the present disclosure for removing the aberration-induced imaging errors of the optical system of the laser scanning microscope 1 according to FIG. 1, it is possible to alter the control of the adaptive optic 18 with the aim of optimizing the metric on a trial basis, without already deteriorating the imaging quality of the laser scanning microscope 1. Of those criterions plotted over the spherical aberration in FIGS. 5 to 7, the metric according to the present disclosure most quickly responds to the aberration-induced imaging errors so that it can already be seen that the metric has left its extremum before leaving the extremum and thus a deterioration of the image quality can be recognized in the other criterions.

FIGS. 8 to 11 show the influence of different aberrations on the metric according to the present disclosure according to FIGS. 4 and 5. Here, a global maximum of the metric is shown, when the respective aberration is zero with a defocus according to FIG. 8 as well as with the spherical aberration according to FIG. 9 as well as with an astigmatisms according to FIG. 10 as well as with a coma according to FIG. 11. Thus, optimizing the metric is suitable for removing imaging errors which are based on any of these four different aberrations.

Figure 12:
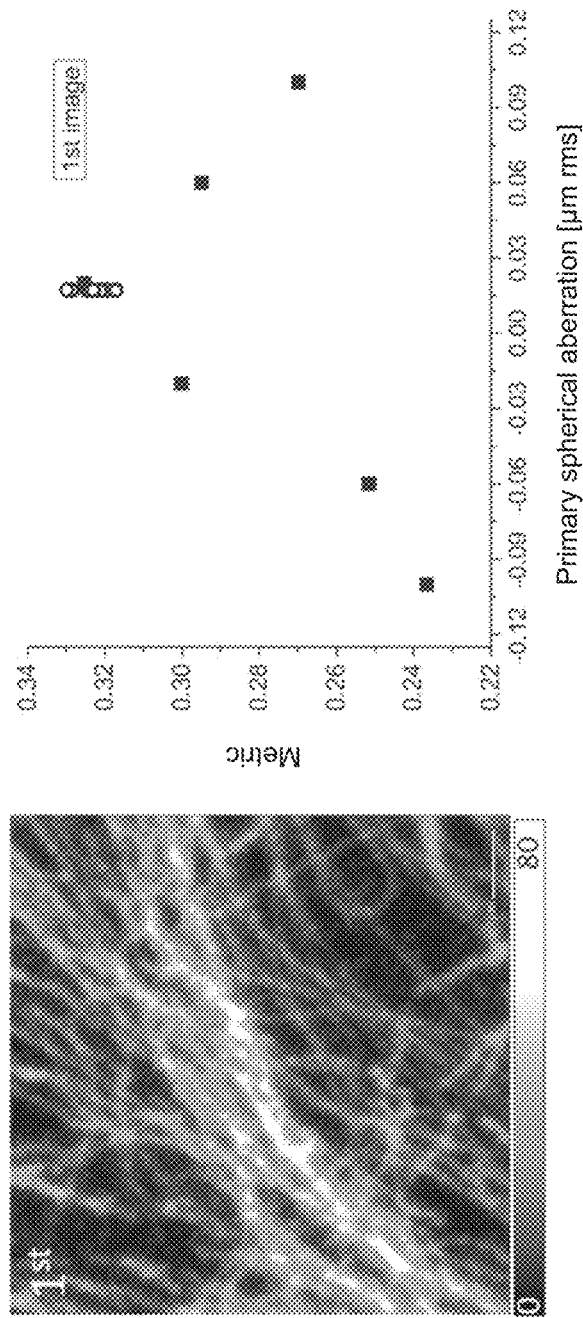
FIG. 12 shows a bright image of a structure marked with a fluorescence dye and the associated course of the metric according to the present disclosure over a spherical aberration.
Figure 13:
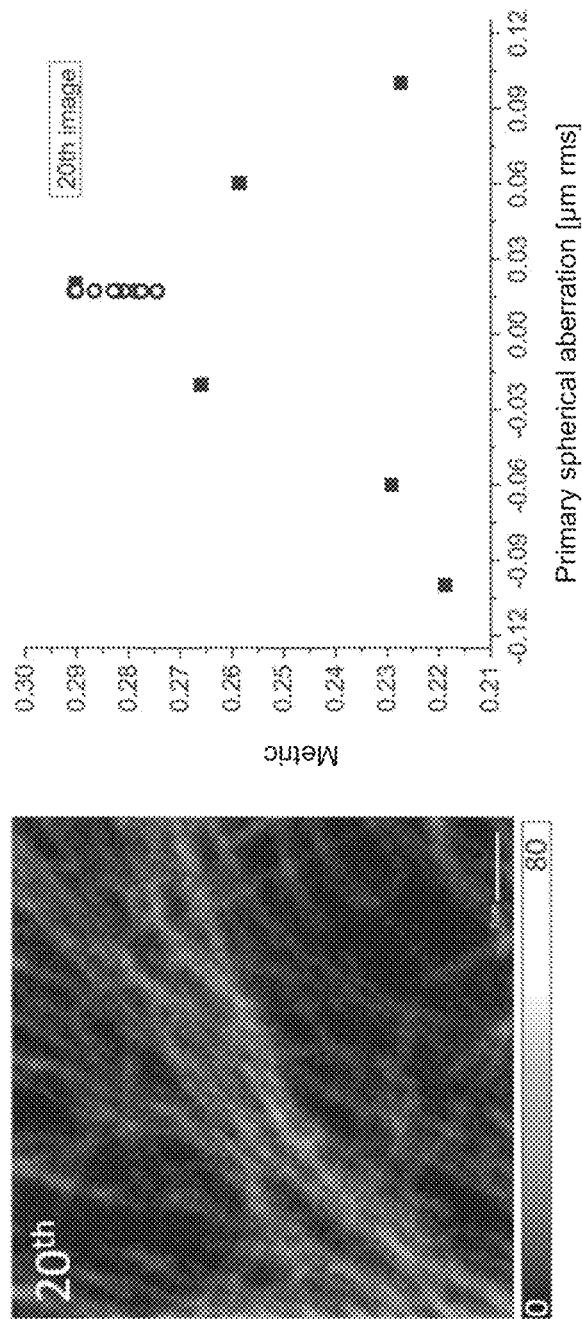
FIG. 13 shows a less bright image of the same structure as in FIG. 12 and the associated cause of the metric according to the present disclosure over the same spherical aberration.
Figure 14:
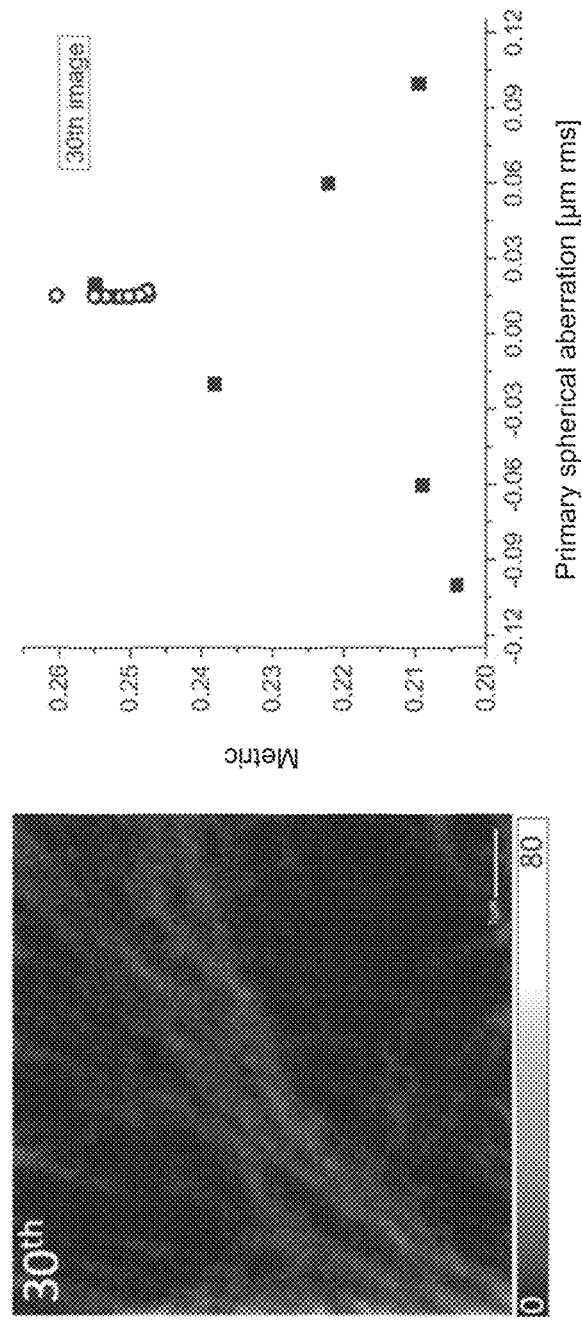
FIG. 14 shows a dark image of the same structure as in FIGS. 12 and 13, and the associated course of the metric according to the present disclosure over the same spherical aberration.

In each of the FIGS. 12 to 14 an image of the same structure is shown with different brightnesses, and the associated metric is plotted corresponding to FIG. 4, i.e. once with preset aberrations (black squares) and once with free running optimization (white circles). The different brightnesses of the images of the structure are based on a different progress of bleaching the fluorescence dyes with which the structure is marked. Independently of the brightness of the images, the metric shows its maximum at the same artificially introduced spherical aberration close to zero, and the optimization of the metric according to the present disclosure is successful. Thus, according to the present disclosure, aberration-induced imaging errors are reliably removed independently of the image brightness.

Figure 15:
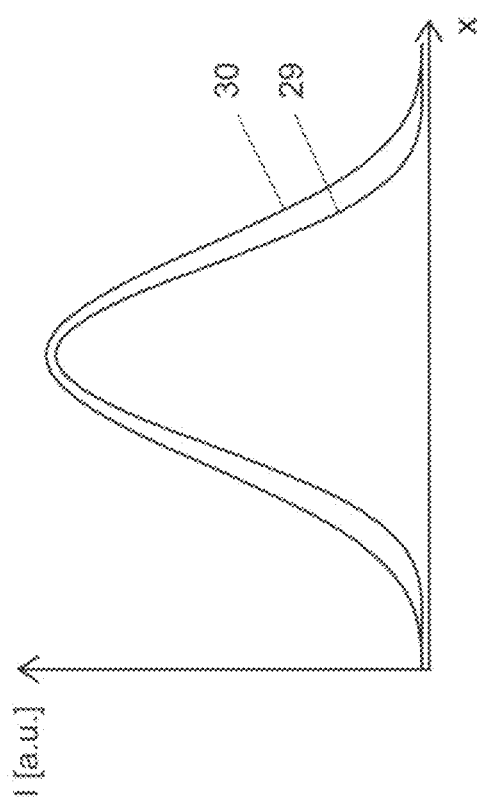
FIG. 15 shows an intensity distribution of excitation light and stimulation light in a focal area of an objective of the laser scanning microscope according to FIG. 1 in another embodiment of the present disclosure.
Figure 16:
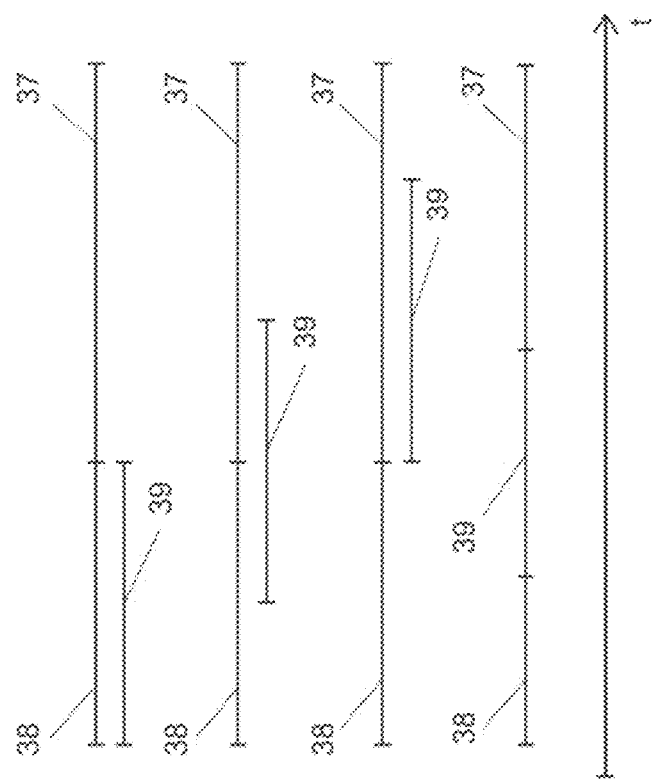
FIG. 16A, FIG. 16B, FIG. 16C, and FIG. 16C show different temporal successions of a first period of time in which the measurement signal is integrated to obtain a first measurement value, a second measurement period of time in which the measurement signal is integrated to obtain a second measurement value, and a third period of time in which the selected light is focused into the focal area of the respective optical system.

FIG. 15 illustrates an alternative intensity distribution 30 of the stimulation light 6 with respect to the intensity distribution 29 of the excitation light 3. Practically, the stimulation light 6 also forms a diffraction limited spot. Even in this case, the optimization of a quotient of early and late photons of the fluorescence light by altering the control of the adaptive optic 18 according to FIG. 1 result in a removal of aberration-induced imaging errors. This even applies then, when the stimulation light 6 does not achieve the saturation intensity Is in the intensity distribution 30 of the stimulation light 6.

FIG. 16A, FIG. 16B, FIG. 16C, and FIG. 16D illustrate different sequences of the first period of time 38 in which the measurement signal 28 from the sample 20 is integrated, the second period of time 37 in which the measurement signal 28 is integrated once again, and a third period of time 39 in which the light 5 having an effect on the measurement signal 28 is focused into the focal area in the sample 20. The third period of time 39 corresponds to the pulse 36 according to FIG. 3 in which the stimulation light 6 is directed onto the sample there. According to FIG. 3, this period of time 37 directly follows to the period of time 38, and the period of time 39 or the pulse 36 overlaps with the later part of the period of time 38. According to FIG. 16A, the sequence of the periods of time 37 and 38 is the same. However, the third period of time 39 completely covers the first period of time 38. According to FIG. 16B, the sequence of the periods of time 37 and 38 is the same again. However, the third period of time 39 here both overlaps with a part of the first period of time 38 and with a part of the second period of time 37. According to FIG. 16C, the sequence of the periods of time 37 and 38 is the same again. However, the third period of time 39 here only overlaps with the second period of time 37. According to FIG. 16D, the third period of time 39 is arranged between the periods of time 37 and 38 without overlap. In any case, the light 5 focused into the sample 20 in the third period of time 39 has a stronger effect on the measurement signal integrated over the later period of time 37 than on the measurement signal integrated over the period of time 38, because the light 5 goes on reducing the measurement signal 28, like, for example, the fluorescence light 22 according to FIG. 1. Thus, the measurement value obtained from integrating the measurement signal 28 in the first period of time 38 would only then not be influenced less by the light 5 than the second measurement value obtained from integrating the measurement signal 28 in the second period of time 37, if the third period of time 39 would completely be before the first period of time 38.

The flowchart 40 of a method according to the present disclosure depicted in FIG. 17 starts with a step of selecting 41 the light 5 and the sample 20 such that the light 5 in acting upon the sample 20 either reduces the measurement signal 28 from the sample 20 or leads the measurement signal 28 from the sample 20 towards a saturation value from below. A variation of the measurement signal 28 depends on an intensity of the light 5. Then, in a step of registering 42 the measurement signal from a focal area of the optical system whose aberration-induced imaging errors are to be corrected is registered and, for example, integrated over the first period of time 38 to determine the first measurement value, and over the later second period of time 37 to determine the second measurement value, while the light 5 is focused into the focal area in the sample 20 by means of the optical system over the third period of time 39. In a step of determining 43, a new measure value, like, for example, a new quotient, is determined from the first and the second measurement values, and then, in a step of determining 44, a difference of the new measure value to a previous measure value is determined. Depending on a direction of the difference of the measure values, a direction of a previous alteration of the control of the adaptive optic 18 is kept or altered in a step of altering 45 the control of the adaptive optic 18. These steps 42 to 45 are repeated in a loop 46. During these repetitions, the focal area of the optical system in the sample 20 may be shifted to continuously optimally compensate aberration-induced imaging errors of the optical system by means of the adaptive optic 18 for different positions of the focal area in the sample 20. Even during the step of registering 42 the measurement signal 28 for determining the first and second measurement values, the focal area may be shifted in the sample 20 in order to average spatially. For this purpose, the periods of time 37 and 39 are to be divided up into corresponding partial periods of time, one partial period of time of each of the periods of time 37 and 39 being associated with the respective position of the focal area in the sample 20.

Figure 17:
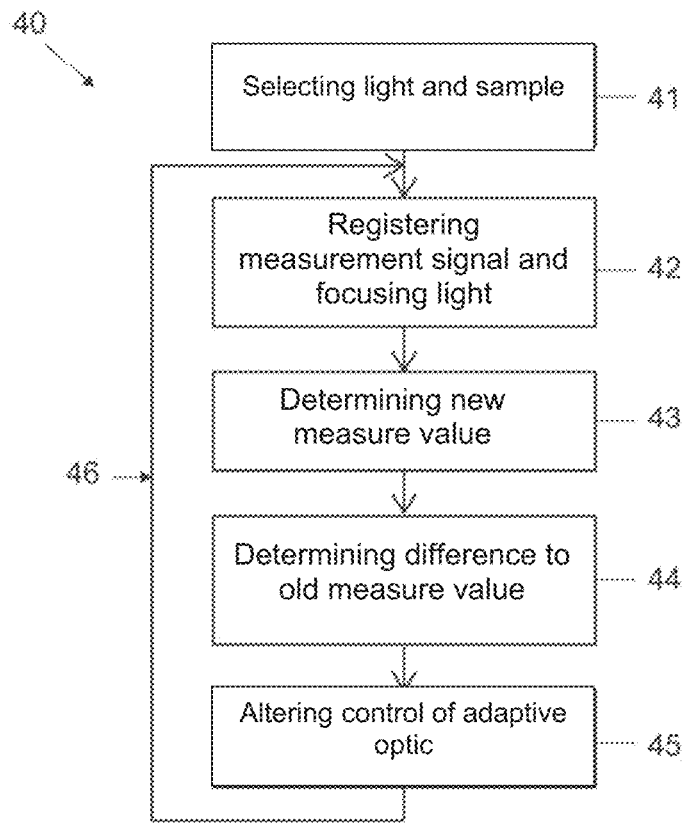
FIG. 17 is a flowchart of the essential steps of a method according to the present disclosure.
Figure 18:
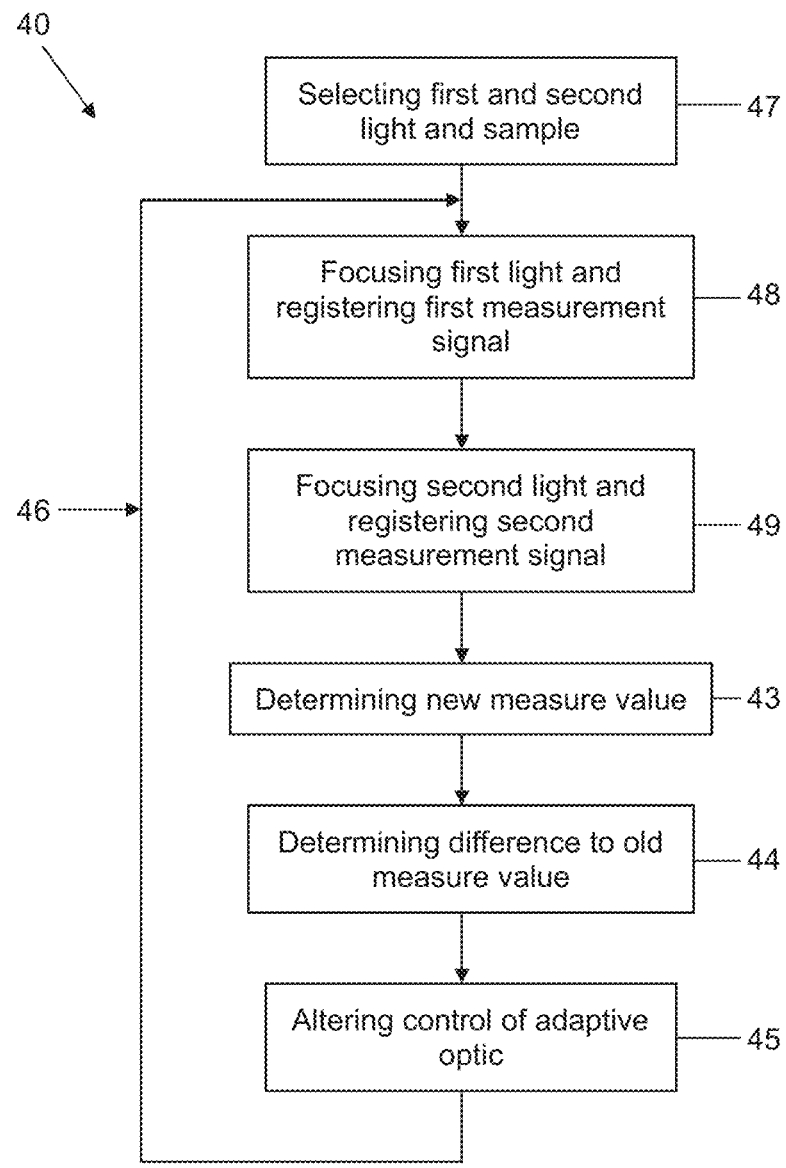
FIG. 18 is a flowchart of the essential steps of a further method according to the present disclosure.

FIG. 18 shows a flowchart 40 of a method which, with respect to the method explained with reference to FIG. 17, is modified as follows. In a step of selecting 47, first light and second light and a sample are selected such that the first light, in acting upon the sample 20, excites a first measurement signal of components of the sample at a first transfer probability which depends on an intensity of the first light at a first power, and that the second light, in acting upon the sample, excites the second measurement signal from the same components, thus particularly from the same fluorescence dyes, of the sample at a second transfer probability which depends on an intensity of the second light at a second power. The first and second powers differ by at least one. Then, in a step of focusing 48, at first the first light is focused by means of the optical system into a focal area of the optical system in the sample, wherein the measurement signal from the focal area excited by the first light is registered over a first period of time 38 to determine a first measurement value. Then, in a further step of focusing 49 the second light is focused by means of the optical system into the same focal area in the sample 20, wherein the second measurement signal from the focal area in the sample 20 excited by means of the second light is registered over a second period of time 37 to determine a second measurement value. Afterwards, in the step of determining 43, in a same way as in the method according to the present disclosure explained with reference to FIG. 7, a new measure value, like, for example a new quotient, is determined, and then, in the step of determining 44, a difference between the new measure value and a previous measure value is determined. In a step of altering 45, the control of the adaptive optic 18 is altered in the same direction as or in another direction than before. Here, the steps repeated in the loop 46 include the steps 48, 49 and 43 to 45.

Figure 19:
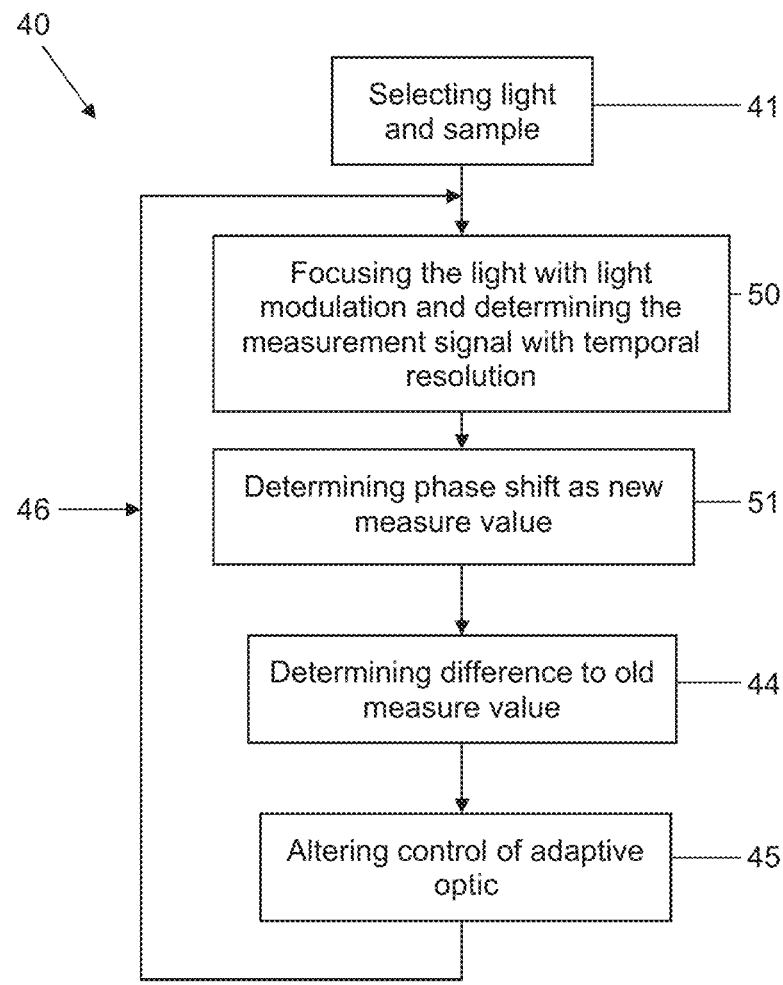
FIG. 19 is a flowchart of the essential steps of even a further method according to the present disclosure.

In the further method according to the present disclosure depicted in FIG. 19 by means of a flowchart 40, the step of selecting 41 corresponds to the step of selecting 41 according to FIG. 17. However, the subsequent step of focusing 50 of the selected light is made with a temporal light modulation of the intensity of the selected light, and the simultaneous step of registering the measurement signal 28 is made with temporal resolution. Then, in a step of determining 51, a phase shift between the light modulation and a signal modulation of the measurement signal 28 is determined as the new measure value. Then, in the step of determining 44, the difference between this new measure value and an old measure value is determined, and the step of altering 45 the control of the adaptive optic 18 is made depending on this difference. Here, the loop 46 includes the steps 50, 51, 44 and 45.

Many variations and modifications may be made to the preferred embodiments of the invention without departing substantially from the spirit and principles of the invention. All such modifications and variations are intended to be included herein within the scope of the present invention, as defined by the following claims.

The invention claimed is:

1. A method of correcting aberration-induced imaging errors of an optical system including an objective and an adaptive optic in a beam path through the objective, the method comprising
    selecting light and a sample such that the light, in acting upon the sample,
        either reduces a measurement signal from the sample,
        or leads a measurement signal from the sample towards a saturation value from below,
wherein a relative variation of the measurement signal depends on an intensity of the light,
    registering the measurement signal from a focal area of the optical system in the sample over a first period of time to determine a first measurement value,
    registering the measurement signal from the focal area of the optical system in the sample over a second period of time to determine a second measurement value,
    focusing the light into the focal area in the sample by means of the optical system over a third period of time,
    wherein
        either the first period of time is at least partially earlier than the second period of time, or the second period of time is at least partially later than the first period of time, or the first period of time is at least partially earlier than the second period of time and the second period of time is at least partially later than the first period of time, wherein the third period of time at least partially overlaps with at least one of the first period of time, the second period of time, and an intermediate period of time arranged in between the first period of time and the second period of time, determining a measure value which is a strictly monotonically increasing or decreasing function of the relative variation of the measurement signal from the first measurement value and the second measurement value, and controlling the adaptive optic using the measure value as a metric that is to be optimized by altering the controlling.

2. The method of claim 1, wherein
the light reduces the measurement signal from the sample, and
wherein an absolute variation of the measurement signal is normalized to a starting value of the measurement signal in determining the measure value.

3. The method of claim 1, wherein the first measurement value is determined as a first integral of the measurement signal over the first period of time, and wherein the second measurement value is determined as a second integral of the measurement signal over the second period of time.

4. The method of claim 1, wherein the measure value is determined as a quotient of the second measurement value and the first measurement value.

5. The method claim 1, further comprising, after the measure value has been determined,
altering the controlling of the adaptive optic in an alteration direction,
once again registering the measurement signal, wherein the light is once again focused into the focal area in the sample,
determining a new measure value,
determining a difference between the new measure value and the previously determined measure value, and
altering the controlling of the adaptive optic once again in the previous or another alteration direction depending on the direction of the difference.

6. The method of claim 1, wherein the measurement signal is measurement light emitted out of the sample that is imagined onto a detector by means of the optical system.

7. The method of claim 6, further comprising, after the measure value has been determined,
altering the controlling of the adaptive optic in an alteration direction,
once again registering the measurement signal, wherein the light is once again focused into the focal area in the sample,
determining a new measure value,
determining a difference between the new measure value and the previously determined measure value, and
altering the controlling of the adaptive optic once again in the previous or another alteration direction depending on the direction of the difference.

8. The method of claim 6, wherein the measurement signal is measurement light emitted out of the sample that is imagined onto a detector by means of the optical system.

9. The method of claim 6,
wherein the measurement signal is fluorescence light that is emitted by fluorescence dyes in the sample, and
wherein the fluorescence dyes, by means of the light, are excited in the focal area into a fluorescent state out of which the fluorescence dyes emit the fluorescence light, until the intensity of the resulting fluorescence light from the fluorescent dyes approaches the saturation value.

10. The method of any of claim 1,
wherein the measurement signal is fluorescence light that is emitted by fluorescence dyes in the sample and
wherein the fluorescence dyes, by means of the light, are excited in the focal area into a fluorescent state out of which the fluorescence dyes emit the fluorescence light, until the intensity of the resulting fluorescence light from the fluorescent dyes approaches the saturation value.

11. The method of claim 1,
wherein the measurement signal is fluorescence light that is emitted by fluorescence dyes in the sample,
wherein the fluorescence dyes, by means of excitation light provided in addition to the light, are excited in the focal area into a fluorescent state out of which they emit the fluorescence light, and
wherein the light is stimulation light which stimulates the fluorescence dyes for stimulated emission before the fluorescence dyes emit the fluorescence light.

12. The method of claim 11,
wherein the additional excitation light is focused into the focal area in the sample by means of the optical system and
wherein an intensity distribution of the light has a central intensity minimum which, in the focal area, coincides with a central intensity maximum of the excitation light.

13. The method of claim 1
wherein the light leads the measurement signal from the sample towards a saturation value from below, and
wherein an absolute variation of the measurement signal is normalized to the saturation value in determining the measure value.

14. A method of correcting aberration-induced imaging errors of an optical system including an objective and an adaptive optic in a beam path through the objective, the method comprising
selecting first light, second light and a sample such that the first light in acting upon the sample excites a first measurement signal from components of the sample at a first transition probability which depends on an intensity of the first light with a first power, and that the second light in acting upon the sample excites the first or a second measurement signal from the same components of the sample at a second transition probability which depends on an intensity of the second light with a second power, wherein the first power and the second power differ by at least 1,
focusing the first light, by means of the optical system, into a focal area of the optical system in the sample, and registering the first measurement signal from the focal area, which is excited by the first light, over a first period of time to determine a first measurement value,
focusing the second light, by means of the optical system, into the focal area in the sample, and registering the first or second measurement signal from the focal area in the sample, which is excited by the second light, over a second period of time to determine a second measurement value, determining a measure value which is a strictly monotonically increasing or decreasing function of a relative variation of the first measurement signal or of a relative difference between the first and the second measurement signal from the first measurement signal and the second measurement signal, and controlling the adaptive optic using the measure value as a metric that is to be optimized by altering the controlling.

15. The method of claim 14, wherein the first light, the second light and the sample are selected such that the first light excites the first measurement signal from the components of the sample by a single photon process, whereas the second light excites the first or the second measurement signal from the same components of the sample by a multi photon process.

16. The method of claim 15, wherein the first measurement value is determined as a first integral of the measurement signal over the first period of time, and wherein the second measurement value is determined as a second integral of the measurement signal over the second period of time.

17. The method of claim 15, wherein the measure value is determined as a quotient of the second measurement value and the first measurement value.

18. The method of claim 15, further comprising, after the measure value has been determined, altering the controlling of the adaptive optic in an alteration direction, once again registering the measurement signal, wherein the light is once again focused into the focal area in the sample, determining a new measure value, determining a difference between the new measure value and the previously determined measure value, and altering the controlling of the adaptive optic once again in the previous or another alteration direction depending on the direction of the difference.

19. The method of claim 15, wherein each measurement signal of the first measurement signal or the first and the second measurement signals is measurement light emitted out of the sample that is imaged onto a detector by means of the optical system.

20. A method of correcting aberration-induced imaging errors of an optical system including an objective and an adaptive optic in a beam path through the objective, the method comprising selecting light and a sample such that the light, in acting upon the sample,
either reduces a measurement signal from the sample, or leads a measurement signal from the sample towards a saturation value from below, wherein a relative variation of the measurement signal depends on an intensity of the light, providing the light with a temporal light modulation of its intensity and focusing the light into a focal area in the sample by means of the optical system, registering the measurement signal from the focal area of the optical system in the sample with temporal resolution, determining a phase shift between the light modulation and a signal modulation of the measurement signal as a measure value which is a strictly monotonically increasing or decreasing function of the relative variation of the measurement signal, and controlling the adaptive optic using the measure value as a metric that is to be optimized by altering the controlling.

21. The method of claim 20, wherein the measurement signal is fluorescence light that is emitted by fluorescence dyes in the sample, wherein the fluorescence dyes, by means of excitation light provided in addition to the light, are excited in the focal area into a fluorescent state out of which they emit the fluorescence light, and wherein the light is stimulation light which stimulates the fluorescence dyes for stimulated emission before the fluorescence dyes emit the fluorescence light.

22. The method of claim 21, wherein the additional excitation light is focused into the focal area in the sample by means of the optical system, and wherein an intensity distribution of the light has a central intensity minimum which, in the focal area, coincides with a central intensity maximum of the excitation light.

* * * * *